Aug. 14, 1962     O. W. OERMAN ETAL     3,049,181
FRONT MOUNTED BEDDER
Filed April 28, 1960     3 Sheets-Sheet 1
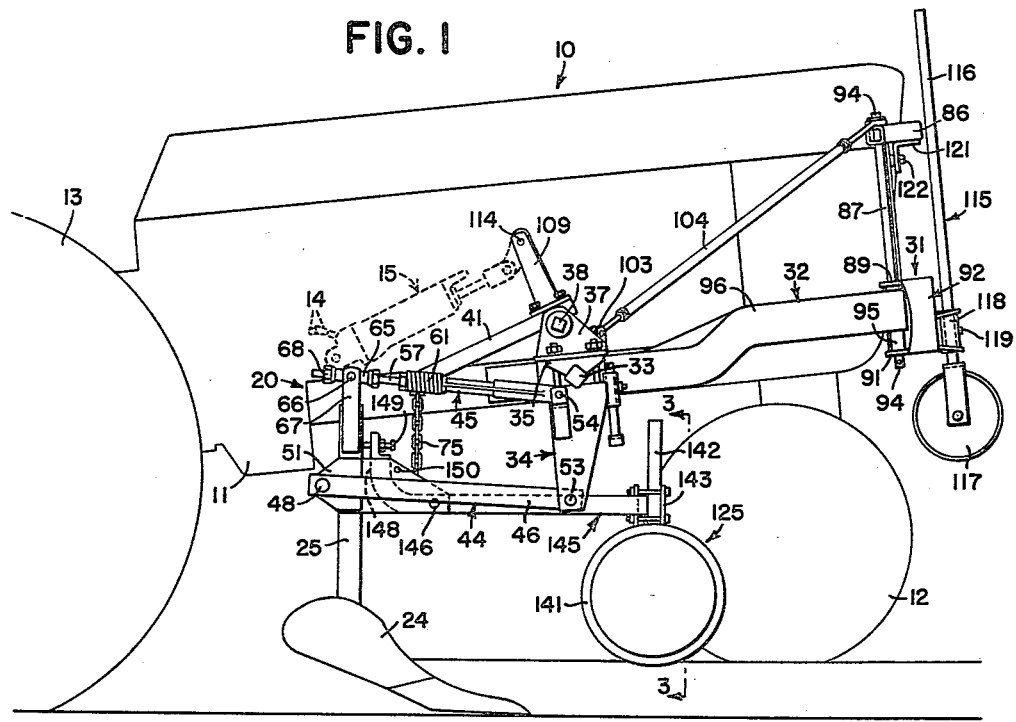
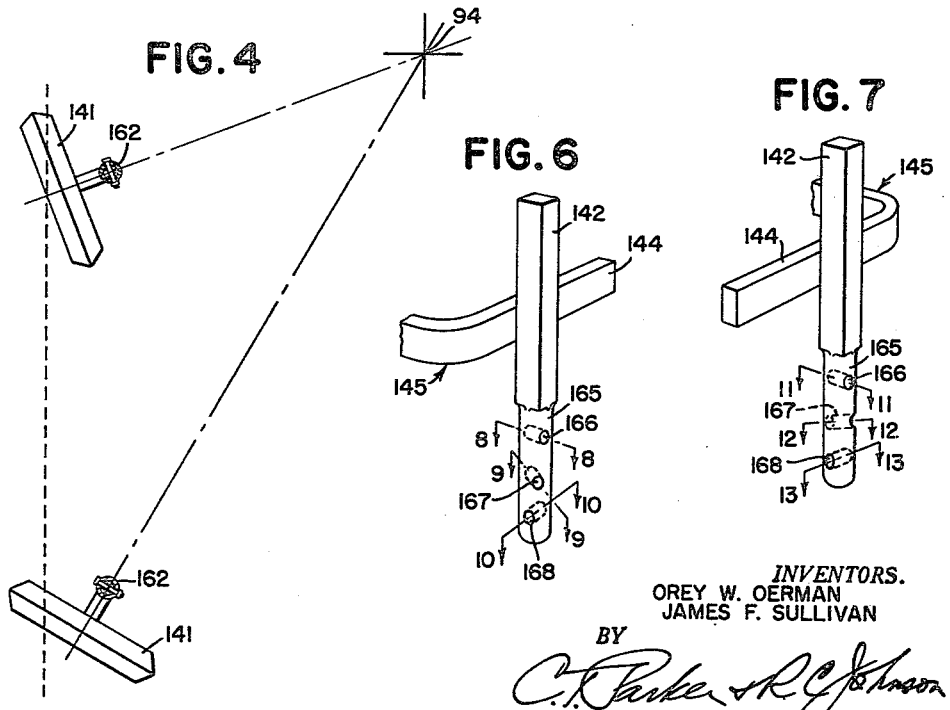
INVENTORS.
OREY W. OERMAN
JAMES F. SULLIVAN
BY
ATTORNEYS

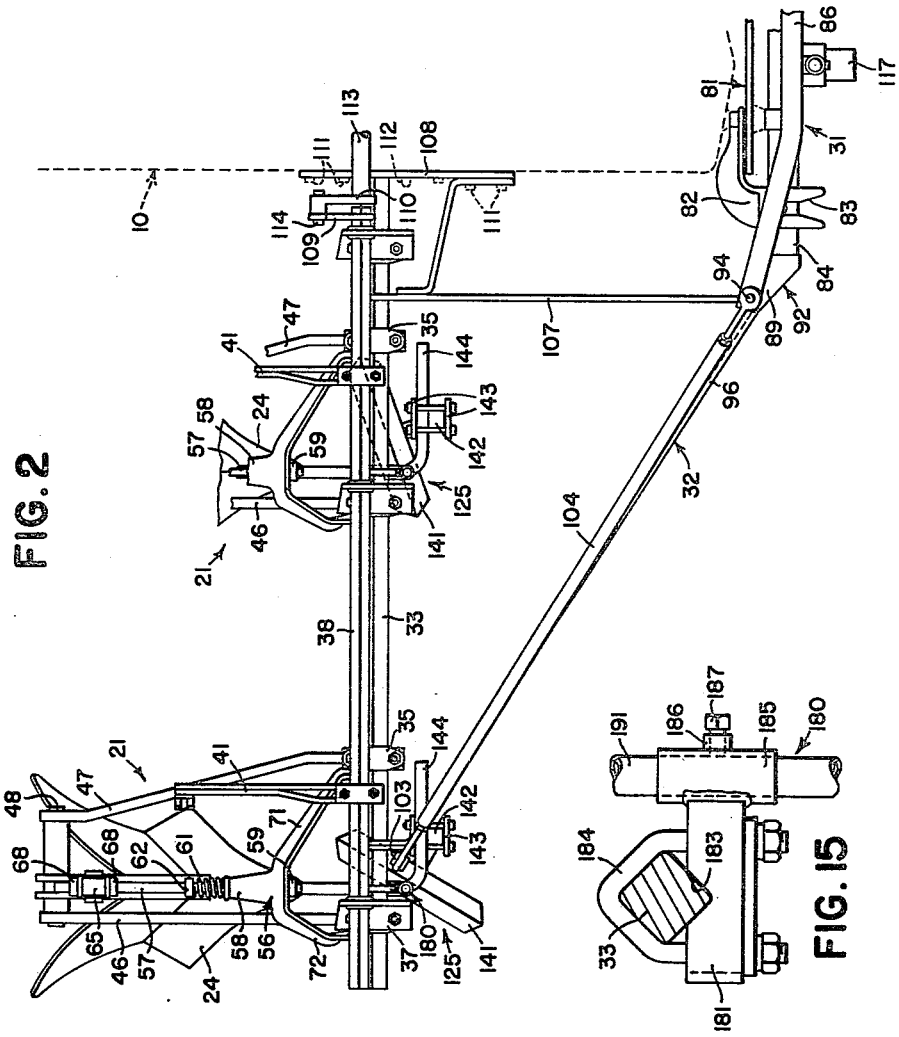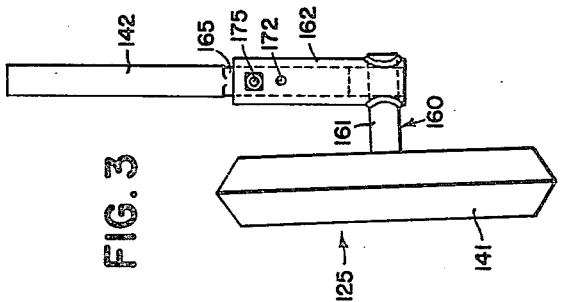

Aug. 14, 1962     O. W. OERMAN ETAL     3,049,181
FRONT MOUNTED BEDDER
Filed April 28, 1960     3 Sheets-Sheet 3
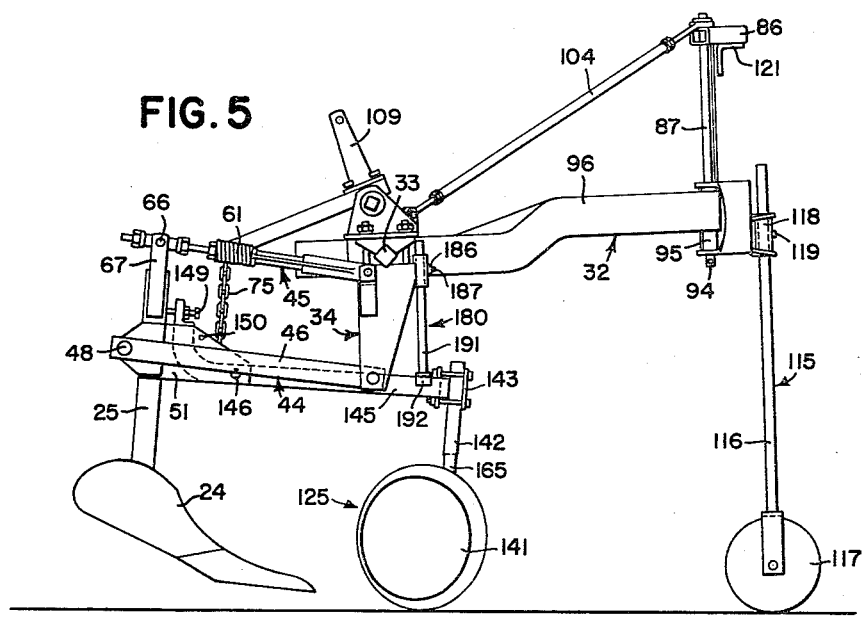
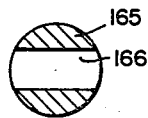
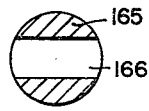
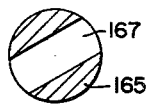
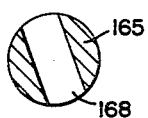
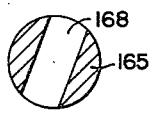
INVENTORS.
OREY W. OERMAN
JAMES F. SULLIVAN
ATTORNEYS

United States Patent Office 3,049,181
Patented Aug. 14, 1962

3,049,181
FRONT MOUNTED BEDDER
Orey W. Oerman, Moline, and James F. Sullivan, East Moline, Ill., assignors to Deere & Company, Moline, Ill., a corporation of Delaware
Filed Apr. 28, 1960, Ser. No. 25,467
13 Claims. (Cl. 172—298)

The present invention relates generally to agricultural implements and more particularly to ground working implements, such as listers, bedders, middlebreakers or the like, that are adapted to be readily attached to and disconnected from the supporting tractor.

The object and general nature of this invention is the provision of new and improved means facilitating the mounting of implements of the above-mentioned type directly on farm tractors, whereby the operator is not required to lift heavy parts when attaching or detaching the implement. Specifically, it is a feature of this invention to provide articulated frame means carrying ground working tools and new and improved gauge wheel means that serve not only to gauge the depth of operation but also to support the attachment frames and their associated parts whereby the movement of the latter into and out of position on the tractor.

Further, a more specific feature of this invention is the provision of tool-carrying articulated frame means that includes a center section and side sections hinged to the center section, the side sections being adapted to be swung outwardly to facilitate driving the tractor into position to receive the center section, after which the side sections are then swung inwardly toward the tractor for connection therewith, the present invention being particularly concerned with the provision of gauge wheel means, usually disposed in a straight ahead position for normal operation, that may be adjusted to a position in which the gauge wheels serve to support the side sections and associated tools when swinging them toward or away from the tractor.

These and other objects and advantages of the present invention will be apparent to those skilled in the art after a consideration of the following detailed description, taken in conjunction with the accompanying drawings, in which:

FIG. 1 is a side view of an implement and tractor combination, in which the principles of the present invention have been incorporated, the various parts being shown in a position they occupy in their normal ground working position.

FIG. 2 is a partial plan view of the outfit shown in FIG. 1 but with the gauge wheels swung to an angled position.

FIG. 3 is a fragmentary elevation of one of the gauge wheel units, being a view taken along the line 3—3 of FIG. 1.

FIG. 4 is a fragmentary plan view generally diagrammatic in nature, illustrating the positions to which the gauge wheels are adjusted when shifting one of the outer frame sections between a working position adjacent the side of the tractor and the laterally outwardly disposed position, permitting the tractor to be driven substantially up against and be connected to the center frame section.

FIG. 5 is a side view of the right hand unit arranged as shown in FIG. 2 but supported free of the tractor.

FIG. 6 is a fragmentary perspective view of one of the right hand gauge wheel standards.

FIG. 7 is a fragmentary perspective view of one of the left hand gauge wheel standards.

FIGS. 8–10, inclusive, are fragmentary sectional views taken along the lines 8—8, 9—9 and 10—10 of FIG. 6, respectively.

FIGS. 11–13, inclusive, are sections of view taken on the lines 11—11, 12—12 and 13—13 of FIG. 7, respectively.

FIG. 14 is a side view of one of the gauge wheel spindles with certain parts broken away.

FIG. 15 is a fragmentary side view of one of the struts that support the frame parts on the gauge wheels when the implement is detached from the tractor.

Referring first to FIG. 1, the tractor is indicated in its entirety by the reference numeral 10 and is of conventional construction, incorporating a generally fore-and-aft extending frame means 11, steerable front wheel means 12 and rear drive wheel means 13. The tractor also includes the suitable hydraulic power means, including hose lines 14 extending to a power cylinder 15 disposed at each side of the tractor.

The implement is indicated in its entirety by the reference numeral 20 and includes a pair of ground working units 21 at each side of the tractor, each unit including a bedder bottom 24 connected to a vertical beam 25. The implement 20 also includes attaching or hitch means connecting the ground working means with the tractor 10, and the implement hitch means includes a generally central frame section 31 and right and left hand outer frame sections 32. Only one of the outer frame sections is shown in detail since the two outer frame sections are substantially identical except that certain parts thereof may be right or left hand, as the case may be.

Each outer frame section 32 is made up of a transverse square bar 33 to which two pairs of depending brackets 34 are connected by pairs of clamp means 35, the upper ends of the brackets 34 and the associated clamp means 35 being shaped to conform to the tool bar 33, as best shown in FIG. 1. Mounted on one clamp member 35 of each pair is a rockshaft supporting bracket 37, the brackets 37 carrying suitable bearing means in which a rockshaft 38 is supported. Arms 41 are fixed to the rockshaft 38, there being one arm above each ground working unit 21, as best shown in FIG. 2.

Each of the ground working units 21 comprises not only the associated bedder bottom 24 and vertical beam 25 mentioned above but also a pair of generally parallel lower and upper link members 44 and 45. Each lower link member 44 is made up of a pair of bars 46 and 47, as will be seen from FIG. 2. For the laterally outer ground working unit 21, the laterally outer bar 46 comprises a generally straight fore-and-aft extending member pivotally connected at its rear end by a pin or shaft 48 to bracket means 51 fixedly carried by the associated beam 25. The pivot member 48 extends all the way through the bracket 51 and at the inner end receives the rear end of the associated generally forwardly and laterally inwardly extending link member 47, whose configuration is best shown in FIG. 2. The forward ends of the link members or bars 46 and 47 are pivotally connected, as at 53, to the lower portions of the associated depending brackets 34 that are fixedly connected to the tool bar 33 as described above.

Each upper link means 45 includes a forward yoke member 56 and a rear threaded shaft member 57, the forward end of which extends all the way through the barrel section 58 of the forward yoke member 56 and receives a lock nut 59 thereon. A spring 61 is disposed about the member 57 between the rear portion of the barrel section 58 and a nut 62 threaded onto the generally central portion of the threaded member 57. The rear end of each member 57 extends through a trunnion member 65 pivoted, as at 66, to the upper ends of a pair of hammer straps 67 (FIG. 1) fixed to the upper portion of the beam 25. Lock nuts 68 serve to fix the trunnion member 65 in position in a fore-and-aft direction along the threaded member 57. The spring member 61 acts as cushioning means yieldably resisting forward displacement of the upper portion of the beam 25 which may be subjected to severe stresses if the bottom 24 should strike a stone or other obstruction. When the associated spring 61 yields, the bottom swings rearwardly generally about the axis of the pivot 48.

Each upper link means 45 includes the forked yoke member 56 mentioned above, and each of these members includes a relatively forwardly and laterally outwardly extending section 71 and a generally directly forwardly extending section 72. As will be seen from FIG. 2, the upper link means 45 is thus provided with laterally spaced apart portions (71 and 72) that assure lateral rigidity. The forward end of each of the link portions 71 and 72 is pivotally connected with the upper end of the associated bracket 34, as indicated at 54 in FIG. 1. The outer end of each of the lift arms 41 is connected with the associated lower link 44 by any suitable means, such as by a chain 75 that extends downwardly from the arm 41 to the bar 47.

Referring again to the attaching or hitch means, mentioned above as including a central frame section 31 and two outer frame sections 32, it will be seen, particularly from FIG. 2, that the hitch means includes a central member 81 attachable to the front of the tractor and carrying at each end a pair of generally forwardly directed upper and lower yokes 82, each of which is forked, as shown at 83, and spaced apart vertically to releasably receive a lower square tube 84 that forms the lower part of the central frame section 31. The member 81 is normally fixed to and is carried more or less permanently on the tractor. The central frame section 31 also includes an upper transverse bar 86 connected at its ends to generally vertical struts in the form of a square tube 87, the lower ends of which are securely fixed to upper and lower sections 89 and 91 of the associated lower yoke member 92. A yoke member 92 is fixed to each end of the lower tube 84. Each pair of upper and lower yoke sections 89 and 91 carries a vertical pivot member 94 receiving a sleeve 95 that is welded to and becomes a part of a laterally and rearwardly extending bar 96, the rear and laterally outer end of which carries a vertical sleeve in which a pivot member is swiveled. The upper end of said pivot member is provided with spaced apertured portions 103 receiving the lower portion of an adjustable brace rod 104, the forward and upper end of which is pivoted to the upper end of the associated vertical pivot member 94, which extends upwardly through the vertical strut 87 and the adjacent end of the bar 86. Each outer frame section 32 also includes a generally rearwardly extending bar 107, the forward end of which is welded to the sleeve 95. The rear end of each of the members 107 includes an inner section 108 and the latter is adapted to be bolted or otherwise fixed against the adjacent side of the tractor frame. As will be seen from FIG. 2, the rear ends of the bars 96 and 107, and the fore-and-aft bar 108, are rigidly secured, as by welding, to the transverse draft bar 33 mentioned above. Fasteners 111, acting in cooperation with a guide pin 112, are employed for detachably connecting the rear ends of the inner bars 107 to the tractor frame when the implement is mounted in position thereon.

Each rockshaft 38 carries at its inner end an apertured arm 109 that, when the implement is in position alongside the tractor (FIG. 2), is adapted to be in coincidental register with an arm 110 on a power operated rockshaft 113 carried as a part of the tractor 10 and actuated by the power cylinder 15 (FIG. 1). The registering arms 109 and 110 have apertures that are adapted to be disposed in alignment and receive a pin 114 that interconnects the arms 109 and 110 and causes them to swing together when the cylinder 15 is actuated.

One of the features of this invention has to do with the convenient and easy connection and disconnection of the implement with and from the tractor. It will be seen from FIG. 2, that each of the frames 32, when disconnected from the tractor, is readily swingable about the axis of the associated pin 94 toward and away from the tractor, the frames 32 and associated parts being swung outwardly and forwardly away from the tractor when the implement is to be disconnected from the tractor, after which the tractor may be backed away from the implement. However, in order to support the implement in its detached relation and, further, to facilitate movement of the implement units toward and away from their attached position, special means are provided, according to this invention.

First, the central attaching frame 31 carries a stand 115 that includes a generally vertical bar 116 and, at the lower end of the latter, a wheel or roller 117. Fixed to the central frame 31 is a sleeve and bracket structure 118 in which the standard 116 is movable, being held in different positions of adjustment by a set screw 119. Also, the upper transverse frame bar 86 carries a bracket 121 fastened detachably to the tractor by fastener 122.

Thus, when the tractor, with implement attached, is driven to the place where it is desired to leave the implement and move the tractor away to some other location, the fastener 122 is removed, the set screw 119 loosened, and the stand 115 dropped to the ground, after which the set screw 119 is retightened with the wheel or roller 117 resting on the ground. Thus, the stand 115 will hold the center frame section 31 in position for convenient reattachment to the tractor whenever desired, and if in reconnecting the tractor the latter should engage the center section 31 and shift the same forwardly, such action will be tolerated by the rolling of the wheel 117 along the ground.

According to this invention, we provide further means facilitating the movement of the outer frames 32 to positions accommodating disconnection of the tractor, and more specifically, we provide a novel form of gauge wheel or structure that is connected with each of the ground working tools and can be used not only for gauging the depth of operation of the tools, but, with suitable adjustments, can be shifted to a position in which the gauge wheels facilitate the shifting of the laterally outer frame sections into and out of connection with the sides of the tractor.

Referring again to FIG. 1, we provide a gauge wheel unit 125 for each of the ground working units 21. Each gauge wheel unit includes a ground engaging wheel 141 journaled at the lower end of the vertical standard 142 that is secured, as by clamps 143, to the laterally turned end 144 of a generally fore-and-aft extending bar 145, the rear portion of which is pivoted, as at 146 (FIG. 1), to the forward extended portion of the bracket plates 51 that are bolted to the beam standard 25. The rear end of the bar 145 is turned upwardly, as at 148, and receives an adjusting set screw 149 that bears against the upper portion of the beam 25. By adjusting the set screw 149 the depth of operation of the associated lister bottom 24 may be adjusted or varied, as desired, as will be seen from FIG. 1. Moreover, if during operation any of the lister bottoms 24 encounter excessively hard ground or an obstruction or the like, the associated spring 61 yields and permits the associated beam 25 to pivot about the pin or shaft 48. As a result of this action, a downward force is exerted on the gauge wheel 141 which reacts against the beam 25 and causes the lister bottom to be raised to a position of lesser depth, thus reducing the load. The set screws 149 also provide for bringing all of the lister bottoms 24 to the same depth of operation under normal working conditions. Suitable stop means, such as a bolt or pin 150, limits the downward movement of the gauge wheel 141 relative to the beam 25 when the lister bottom is raised relative to the tractor into a transport position as by extension of the power cylinder 15.

Each gauge wheel unit 125 comprises, not only the standard 142 mentioned above, but also, as best shown in FIG. 3, a gauge wheel spindle 160 that includes a generally laterally and downwardly extending axle 161 and a generally vertical sleeve 162 to which one end of the axle 161 is fixed in any suitable way. The lower end of the standard 142 is rounded, as at 165 (FIGS. 6 and 7), the upper portion of the standard 142 being square in section. The lower rounded portion of the standard 142, as best shown in FIG. 6, is provided with a series of three holes or apertures 166, 167 and 168. The upper opening 166 is disposed, when the standard 142 is clamped in place to the associated gauge wheel arm 145, in a fore-and-aft extending direction, and as best shown in FIG. 9, the next lower opening 167 is disposed in a horizontal plane but lies at an angle of about 30° with respect to the vertical fore-and-aft extending plane containing the uppermost aperture 166. The lowermost aperture or opening 168 is, as best shown in FIG. 10, disposed at an angle of about 70° to the aforesaid vertical longitudinal extending plane. It will be understood that the particular angles mentioned above are merely illustrative.

Each spindle assembly sleeve 162 (FIG. 14) is provided with two vertically spaced apertures in the upper portion of the sleeve, both apertures lying in a generally vertical plane that extends substantially perpendicular to the vertical plane containing the axis of the spindle 161. The upper opening in the sleeve 162 is indicated by the reference numeral 171 and the lower opening is indicated by the reference numeral 172. The vertical spacing between the openings 171 and 172 is the same as the vertical spacing between the openings 167 and 168 (FIG. 6) in the lower portion of the standard 142, for a reason which will be explained below.

When the implement is arranged for ground working operation, the spindle assemblies are disposed on the lower portions of the inner and outer standards 142 so that the upper openings 171 in the sleeves 162 will register with the fore-and-aft extending openings 166 in the standards 142, after which a suitable locking pin or bolt 175 is inserted in each set of openings 166, 171 to hold the parts in the desired relation. The pins 175 will hold the gauge wheels 141 in a position in which the planes of the gauge wheels extend in a generally fore-and-aft direction coinciding with the direction of forward travel. The gauge wheel standards 142 may be arranged so that the associated spindles 161 extend either laterally inwardly or laterally outwardly, as desired, so as to have, for example, the gauge wheels 141 disposed immediately ahead of the associated ground working tool 24. As will be seen from FIG. 2, both the laterally outer gauge wheel unit and the laterally inner gauge wheel unit are arranged with the spindles extending laterally outwardly from the associated standard 142 but either or both may be arranged so that the spindle or spindles thereof extend laterally inwardly, depending on such factors as row spacing or other conditions.

FIG. 1 shows the various parts in the positions they occupy during normal operation. In order to adjust the gauge wheel parts to facilitate swinging the outer frames away from the tractor and into position to permit the tractor to be backed out of the implement, the first step is to extend the piston 15 to rock the tractor rockshaft 113 and the implement rockshafts 38 so as to lift the tools out of contact with the ground and into a transport position, the tools 21 being raised so that substantially all weight is taken off the gauge wheels but leaving the latter in contact with the ground. Then by taking out the several bolts or pins 175, each of the gauge wheel arms 145, together with the associated standard 142, is then raised relative to the gauge wheel until one or the other of the lower openings 167 or 168 is brought into registry, as by turning the gauge wheel to a different angle, with one or the other of the sleeve openings 171 and 172. In the case of the outer gauge wheels, each is turned through an angle of approximately 30° so as to bring the upper sleeve opening 171 in line with the middle opening 167 in the laterally outer standard 142. In the case of the inner gauge wheels, each is turned through approximately 70° to bring the lower sleeve opening 172 into registry with the lower standard opening 168. After the gauge wheel units are turned into the positions desired, the bolts or pins 175 are reinserted and locked in place. As will be seen from FIG. 4, this places each outer gauge wheel 141 in a position in which the axis of rotation of the gauge wheel extended passes substantially through the axis of pivoting, as defined by the vertical pin 94, of the associated outer frame section. In the case of the inner gauge wheel unit, the wheel and spindle assembly is rotated on the lower end of the laterally inner standard 142 until the lower opening 172 of the sleeve 162 is lined up with the lowermost opening 168 in the lower end of the standards 142. This disposes the laterally inner gauge wheel in a position in which the axis of rotation of the wheel extended also passes through the axis defined by the associated rod or pivot pin 94.

It will be seen from FIG. 7 that the gauge wheel standards 142 for the left hand units are substantially exactly the same as the standards for the right hand units except that one is made right hand and the other left hand, as will be seen by comparing FIGS. 9 and 10 with FIGS. 12 and 13.

In order to impose the weight of the draft bar 33 and associated parts including the bottoms 24 on the gauge wheels, fixed in the positions just referred to, we provide a frame lock-up strut 180 for each ground working unit. As best shown in FIGS. 5 and 15, each strut 180 includes an attaching bracket or support arm 181 notched adjacent one end to fit against the lower side of associated draft bar 33 and fixed to the latter by suitable clamp means 184. One end of the arm 181 is welded to a vertical sleeve 185 and the latter, opposite the arm 181, has welded thereto a nut member 186 that serves to receive the set screw 187. A standard 191, which preferably is in the form of a tubular member, is disposed within the sleeve 185 and extends downwardly therefrom, having a yoke 192 welded to the lower end of the standard 191. The yoke 192 is dimensioned to engage against and embrace the upper edge portion of the associated gauge wheel arm 145.

Thus, when the gauge wheels 141 are in contact with the ground while the tool means 21 are held in a raised position, the stands 180 may be mounted as just described and the set screws 187 tightened. Pressure in the cylinder or cylinders 15 may then be relaxed and the weight of each draft bar and the associated parts imposed directly on the gauge wheels 141 through the stands or struts 180.

With the struts 180, one for each gauge wheel unit 125, connected between the draft bar 33 and the forward ends of the gauge wheel arms 145, the frame sections 31 and 32 are supported by the stand 115 and the gauge wheels 141. Also, the bottoms 24 are supported off the ground since, although the links 44 and 45 are freely swingable, the downward movement of the beams 25 is terminated when the stop screws 149 engage the associated beams 25, as illustrated in FIG. 5. The outer frame sections 32 may, when arranged as just described, be readily shifted manually away from the tractor, after disconnecting the fasteners 111, and shifted around into an outspread position so as to accommodate backing of the tractor away from the implement.

The implement is thus left standing on the gauge wheels 141 and the front stand 115. The implement may be reattached to the tractor by substantially the reverse of the steps mentioned above. Briefly, the tractor is driven into the standing implement until the yokes 83 receive the cross member 84. If the tractor should bump the center frame, no particular harm is done since the center frame may move forwardly, being supported on the center wheel 117. In fact, driving the tractor forwardly into the standing frame structure may be utilized to swing the outer frames backwardly since they are supported mainly on the gauge wheels 141, which wheels are free to roll rearwardly and laterally inwardly about the axes defined by the vertical pivot members 94. Then the fasteners 111 may be attached and also the pins 114 reinserted to interconnect the arms 109 and 110. When the fasteners 111 are in place, the weight of the draft bar 33 and associated parts is then supported on the tractor, so that the set screws 187 may be loosened and the supporting struts 180 removed. After removing the locking pins or bolts 175, the gauge wheels 141 and the associated spindle assemblies are then shifted back to their straight ahead position as illustrated in FIG. 2 and the pins reinserted into the aligned openings 166 and 171.

While we have shown and described above the preferred structure in which the principles of this invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. The combination with a tractor mounted implement including detachable frame means comprising a center section and outer sections swingably connected at their laterally inner portions to said center section and shiftable relative to the center section about generally vertical axes from a position substantially against the sides of the tractor to a position laterally outwardly thereof, and ground working means connected with said outer frame sections and normally swingable generally vertically relative to the associated outer frame section between a ground working position and a position out of engagement with the ground, of frame supporting means for said frame means to facilitate connecting said frame means to and disconnecting it from the tractor, comprising ground engaging supporting means connected with said center section to support the latter when disconnected from the tractor, a pair of ground engaging gauge wheel means, means connecting each of the latter with the associated outer frame section in such a manner that the ground working means may be disposed out of engagement with the ground and means associated with the gauge wheel means to permit the axis of rotation of the gauge wheel means to extend substantially through the vertical axis of swinging of the outer frame section.

2. The combination with a tractor mounted implement including detachable frame means comprising a center section and outer sections swingably connected at their laterally inner portions to said center sections and shiftable relative to the center section about generally vertical axes from a position substantially against the sides of the tractor to a position laterally outwardly thereof, and ground working means connected for generally free vertical movement with each of said outer frame sections between a ground working position and an elevated position of frame supporting means for said frame means to facilitate connecting said frame means to and disconnecting it from the tractor, comprising a gauge wheel for each of said ground working means, means connecting each gauge wheel to the associated ground working means, said last mentioned means including means to hold said gauge wheel in either of two positions, one in which the axis of the gauge wheel extends transversely of the line of travel and the other in which the axis of the gauge wheel extends through the vertical axis of swinging of the associated outer frame section with respect to the center section, and means adapted to be connected between each gauge wheel and its associated outer frame to hold the ground working means in its elevated position.

3. The combination with a tractor mounted implement including detachable frame means comprising a center section and outer sections swingably connected at their laterally inner portions to said center section and shiftable relative to the center section about generally vertical axes from a position substantially against the sides of the tractor to a position laterally outwardly thereof, and ground working means connected for generally free vertical movement with said outer frame sections between a ground working position and an elevated position, of supporting means for said frame means and said ground working means to facilitate connecting said frame means to and disconnecting it from the tractor, comprising a ground engaging gauge wheel connected with each ground working means to govern the depth of operation of said ground working means, means adapted to interconnect said gauge wheel means and said frame means to hold said ground working means in an elevated position so that, when disconnected from the tractor, said frame means may be supported on said gauge wheels, and the means connecting the gauge wheels with the associated ground working means including parts relatively adjustable about a generally vertical axis so that the axis of rotation of each gauge wheel may extend substantially through the vertical axis of swinging of the associated outer frame section.

4. The invention set forth in claim 3, further characterized by said means interconnecting the gauge wheel means and the frame means comprising strut means connected between each outer frame section and the associated gauge wheel.

5. The invention set forth in claim 3, further characterized by each of said outer sections including a normally laterally outwardly extending draft bar, generally vertically swingable link means connecting said ground working means with the associated draft bars, a generally fore-and-aft extending gauge wheel arm connecting each gauge wheel with the associated ground working means, and said means interconnecting the gauge wheel means and the frame means comprising strut means connected between each draft bar and each of the associated gauge wheel arms.

6. The combination with a tractor mounted implement including detachable frame means comprising a center section and outer sections swingably connected at their laterally inner portions to said center section and shiftable relative to the center section about generally vertical axes from a position substantially against the sides of the tractor to a position laterally outwardly thereof, and ground working means connected with said outer frame sections and normally swingable generally vertically relative to the associated outer frame section between a ground working position and an elevated position, of frame supporting means for said frame means to facilitate connecting said frame means to and disconnecting it from the tractor, comprising ground engaging gauge wheel means, one connected with each outer frame section, each ground engaging gauge wheel means including a gauge wheel, a generally vertical gauge wheel standard fixed to the associated ground working means and having at its lower end gauge wheel receiving means, a gauge wheel spindle means including a generally horizontal wheel-receiving axle and a generally vertical sleeve adapted to be rotatably disposed on said gauge wheel receiving means, the associated gauge wheel being mounted on said axle, and means fixing said sleeve to the lower end of said standard in different selected positions relative to said gauge wheel receiving means and a vertically rigid element connecting each outer frame section and the associated gauge wheel means to hold said ground working means in an elevated position.

7. The invention set forth in claim 6, further characterized by said sleeve being dimensioned to fit over the gauge wheel receiving means of the associated standard, said sleeve and said gauge wheel receiving means having sets of openings spacially arranged to come into alignment to determine different positions of said gauge wheel relative to the standard, and pin means insertable into said aligned openings to retain the selected position.

8. An implement adapted to be detachably mounted on a tractor, comprising detachable frame means including a center section and outer sections swingably connected at their laterally inner portions to said center section and shiftable relative to the center section about generally vertical axes from a position substantially against the sides of the tractor to a position laterally outwardly thereof to facilitate connecting and disconnecting the tractor and implement, ground working means connected for free vertical movement with said outer frame sections between a ground working position and an elevated position, a gauge wheel arm fixed to and extending generally forwardly of each ground working means, a gauge wheel for each arm, a standard fixed to each gauge wheel arm in a generally vertical position, means mounting said gauge wheel in selected angular positions on the lower portion of the standard, and means adapted to be connected between each gauge wheel standard and the associated outer frame section.

9. An implement adapted to be detachably mounted on a tractor, comprising detachable frame means including a center section and outer sections swingably connected at their laterally inner portions to said center section and shiftable relative to the center section about generally vertical axes from a position substantially against the sides of the tractor to a position laterally outwardly thereof to facilitate connecting and disconnecting the tractor and implement, a pair of ground working units connected in laterally spaced apart relation to each outer frame section for generally free vertical movement relative thereto between a ground working position and an elevated position, a gauge wheel arm fixed to each unit and normally movable generally vertically with the latter, a generally vertical gauge wheel standard fixed to each gauge wheel arm and each standard having a plurality of vertically and angularly spaced apart openings, a gauge wheel axle assembly including a generally vertical sleeve portion having openings adapted to be aligned with selected openings in each standard, said openings being arranged so that said axle assemblies may be positioned on and fixed to said standards with both gauge wheels disposed in generally vertical fore-and-aft extending planes and, optionally, disposed so that the axes of rotation of both wheels so angled that said axes pass through the vertical axis of swinging of the associated outer frame section relative to the center frame section, and means connected between each gauge wheel standard and the associated outer frame section to hold the ground working means in its elevated position.

10. An implement adapted to be detachably mounted on a tractor, comprising detachable frame means including a center section and outer sections swingably connected at their laterally inner portions to said center section and shiftable relative to the center section about generally vertical axes from a position substantially against the sides of the tractor to a position laterally outwardly thereof to facilitate connecting and disconnecting the tractor and implement, ground working means connected for free vertical movement with said outer frame sections between a ground working position and an elevated position, a gauge wheel arm fixed to and extending generally forwardly of each ground working means, a gauge wheel for each arm, a standard fixed to each gauge wheel arm in a generally vertical position, means mounting said gauge wheel in selected angular positions on the lower portion of the standard, and means adapted to be connected between each gauge wheel standard and the associated outer frame section to hold the ground working means in an elevated position.

11. An implement adapted to be detachably mounted on a tractor, comprising detachable frame means including a center section and outer sections swingably connected at their laterally inner portions to said center section and shiftable relative to the center section about generally vertical axes, each of said outer sections including a forward apical portion connected with the adjacent end of said center section and a rearwardly disposed draft bar section carrying depending bracket means, generally parallel link means connected with said bracket means and extending generally rearwardly therefrom, ground working means connected with the rear ends of said link means and normally swingable generally vertically relative to the associated outer frame section between a ground working position and an elevated position, a gauge wheel arm fixed at its rear end to the associated ground working means and extending forwardly therefrom, a generally vertical gauge wheel standard fixed at its upper end to the forward end of the associated gauge wheel arm, a gauge wheel, means mounting said gauge wheel in selected vertical and angular positions on the lower portion of the associated standard, and means adapted to be connected between each gauge wheel standard and the associated outer frame section to impose at least a portion of the weight of said outer frame section and the associated ground working means on the gauge wheel by holding the ground working means in its elevated position, thereby facilitating shifting the outer frame sections and associated parts toward and away from the sides of the tractor.

12. The invention set forth in claim 11, further characterized by said means connected between the gauge wheel standard and the associated frame section comprising a strut having means at its lower end to engage the gauge wheel arm and means on the draft bar to adjustably receive the upper end of said strut.

13. In a tractor mounted implement having detachable frame means comprising a center section and outer sections swingably connected at their inner portions to said center section and shiftable relative to the center section about generally vertical axes from a position substantially against the sides of the tractor to a position laterally outward thereof, the outer frame sections being adapted to carry ground-working means, the improvement comprising frame supporting means for said frame means to facilitate connecting said frame means to and disconnecting it from the tractor, comprising ground engaging supporting means connected with the center section to support the latter when disconnected from the tractor, one or more ground working means carried by each outer section and vertically shiftable between a ground working position and an elevated position, a pair of ground engaging gauge wheel means, said gauge wheel means including a gauge wheel for each of said ground working means, means connecting each gauge wheel to the associated ground working means, said connecting means including means to hold said gauge wheel in either of two positions, one in which the axis of the gauge wheel extends transverse to the line of travel, and the other in which the axis of the gauge wheel extends through the vertical axis of swinging of the associated outer frame section, and means connecting each gauge wheel means with the associated outer frame section in such a manner that the ground working means may be disposed out of engagement with the ground.

References Cited in the file of this patent

UNITED STATES PATENTS

| | | |
|---|---|---|
| 1,962,349 | Johnson | June 12, 1934 |
| 2,697,974 | Silver et al. | Dec. 28, 1954 |
| 2,777,377 | Johnson et al. | Jan. 15, 1957 |

FOREIGN PATENTS

| | | |
|---|---|---|
| 1,018,316 | France | Oct. 15, 1952 |